UNITED STATES PATENT OFFICE.

GEORGE LUNGE, OF ZURICH, SWITZERLAND, AND JAMES DEWAR, OF CAMBRIDGE, ENGLAND.

PROCESS OF RECOVERING SULPHUR, CARBONATE OF SODA, AND IRON OXIDE.

SPECIFICATION forming part of Letters Patent No. 480,109, dated August 2, 1892.

Application filed December 19, 1891. Serial No. 415,660. (No specimens.) Patented in England May 9, 1891, No. 8,018; in France December 5, 1891, No. 217,871, and in Belgium December 8, 1891, No. 97,497.

*To all whom it may concern:*

Be it known that we, GEORGE LUNGE, residing at Zurich, Switzerland, and JAMES DEWAR, residing at Cambridge, county of Cambridge, England, citizens of England, have invented a new and useful Process for the Recovery of Sulphur, Carbonate of Soda, and Iron Oxide from the Residue of a Soda Process, (for which we have obtained Letters Patent in Great Britain, dated May 9, 1891, No. 8,018; in France, dated December 5, 1891, No. 217,871, and in Belgium, dated December 8, 1891, No. 97,497,) of which the following is a specification.

According to a process for the production of caustic soda from sulphate of soda the soda is first converted into sodium sulphide, and this sulphide in aqueous solution is filtered through or digested with ferrite of iron, which latter substance is obtained by roasting at a red heat carbonate of soda and sesquioxide of iron, the result of this treatment being the production of a solution of caustic soda and of a residue consisting mostly of a double sulphide of sodium and iron, or it may be of several such double sulphides, the composition of which is not exactly known. In what follows the term "residue" is to be understood as indicating the substance just described.

The object of our invention is to treat this residue, which it is at present difficult to utilize in such a manner as to decompose it as far as possible, producing free sulphur, carbonate of soda, and hydrated oxide of iron, which are separated by suitable means, and of which the latter are suitable for being utilized again in the soda process above referred to.

According to our process we act on the residue in a moist state or in the state of more or less fluid mud, with a mixture of carbonic-acid gas and atmospheric air, which may be applied in various proportions; but we practically find about one volume of carbonic-acid gas to four volumes of air a very suitable mixture. We apply this at ordinary temperatures or temperatures only slightly differing from that of the surrounding locality, either by forcing or drawing the mixed gases through the more or less fluid residue or by causing the mixed gases without any great pressure to pass over the moist residue, which is spread out so as to expose a large surface, and from time to time or continuously turned over, so as to expose new surfaces to the action of the gases.

The carbonic-acid gas employed may be obtained in a very cheap way, since the admixture of nitrogen, carbon monoxide, or other gases, which render crude carbonic-acid gas useless for many other manufacturing purposes, is in our process of no consequence, so long as the proportion of oxygen is not excessive. We may therefore employ any cheap source of carbonic-acid gas, such as limekiln-gases or furnace-gases or the carbonic acid evolved in the operation of reducing sulphate of soda to sodium sulphide, which is available for treatment of the residue according to our process. Where the proportions of carbonic acid and oxygen in the gaseous mixture employed are not approximately suitable for the decomposition to be effected, they may be corrected by mixing with another gas richer in carbonic acid or with atmospheric air or gases containing less carbonic acid, as the case may require. By operating on the residues, as above described, the sulphides are decomposed in such manner that no sulphureted hydrogen or only a trace of this gas is evolved. The gases passing away from the decomposing apparatus may therefore in most cases be allowed to escape freely. Where, however, special precautions are called for in order to absorb the last traces of sulphureted hydrogen, the gases which pass off may be treated by any known process or apparatus for dealing with sulphureted hydrogen. We prefer, however, to pass these gases through residue decomposed in a previous operation and therefore containing hydrated oxide of iron, which absorbs and retains sulphureted hydrogen.

If the process is carried out according to the above description the decomposition differs from processes dealing with similar double sulphides by taking place in such manner that the sodium is mostly converted into carbonate and the iron into hydrated sesquioxide, most of the sulphur being separated in the free state. A certain quantity of soda is also converted into hyposulphite (thiosulphate;) but this quantity is comparatively slight and does not interfere with the utilization of the carbonate of soda forming the bulk of the soda recovered in the soluble state. Another quantity of soda is usually left behind in an insoluble state, probably in that of a special double sulphide or of sulphides of sodium and iron. The quantity of this insoluble soda is the less the longer the treatment of the residue with the mixture of carbonic acid and oxygen is carried on; but it is unnecessary to aim at a complete decomposition, which would cost more than it is worth, since the comparatively slight quantity of soda left in the insoluble state does not interfere with the utilization of the insoluble part of the residue as a whole.

When the gaseous treatment of the residue has been carried on as far as it is desirable, the product of the operation is treated by well-known means, in order to separate from one another the soluble sodium salts, the free sulphur, and the hydrated oxide of iron containing some admixture of insoluble sodium compounds. A convenient way of effecting this separation is as follows: The soluble sodium salts are extracted by lixiviation and are utilized as an ordinary commercial solution of sodium carbonate, either for the production of caustic soda or for that of commercial carbonate or for renewed use in the original process for manufacturing "ferrite of soda." The insoluble residue left behind on lixiviation is dried and the sulphur is extracted therefrom either by means of disulphide of carbon or by melting it out or by distillation or by burning it into sulphur dioxide or in any other suitable way. According to the way in which the extraction of sulphur is effected the last residue contains the oxide of iron either in a hydrated or in a partially or entirely anhydrous state, mixed with any undecomposed sodium, iron sulphide, and other accidental impurities. It can be utilized for the manufacture of ferrite of soda or for other purposes. If desired, the soda can be completely extracted from it by roasting it with air and lixiviating the sulphate of soda thus formed.

If the sulphur has been previously extracted by burning into sulphurous acid the residue left does not require a special roasting for converting the soda into sulphate.

Having thus described the nature of this invention and the best means we know of carrying the same into practical effect, we claim—

The herein-described process of recovering sulphur, carbonate of soda, and iron oxide from the residue obtained by decomposing sodium sulphide with a ferrite, which consists in acting on the said residue in a moist condition with a suitable mixture of carbonic acid and oxygen.

In testimony whereof we have signed our names to this specification, in the presence of two subscribing witnesses, this 14th day of August, A. D. 1891.

GEORGE LUNGE.
JAMES DEWAR.

Witnesses to the signature of George Lunge:
G. F. WARREN,
  *Notary Public.*
OLIVER IMRAY,
*Patent Agent, 28 Southampton Buildings, London, W. C.*
Witnesses to the signature of James Dewar:
OLIVER IMRAY,
*Patent Agent, 28 Southampton Buildings, London, W. C.*
JNO. P. M. MILLARD,
*Clerk to Messrs. Abel & Imray, Consulting Engineers and Patent Agents, 28 Southampton Buildings, London, W. C.*